(12) United States Patent
Artsiely (10) Patent No.: US 7,210,712 B2
(45) Date of Patent: May 1, 2007

(54) ROTARY MOTION MECHANISM (75) Inventor: Eyal Artsiely, Moshav Fazael (IL)

(73) Assignee: Rav Bariach Security Products Ltd., Mul-T-Lock Park, Yavne (IL)

( * ) Notice: Subject to any disclaimer, the term of this patent is extended or adjusted under 35 U.S.C. 154(b) by 86 days.

(21) Appl. No.: 10/517,405

(22) PCT Filed: Jan. 9, 2003

(86) PCT No.: PCT/IL03/00027

§ 371 (c)(1),
(2), (4) Date: Dec. 8, 2004

(87) PCT Pub. No.: WO03/060349

PCT Pub. Date: Jul. 24, 2003

(65) Prior Publication Data

US 2006/0053923 A1    Mar. 16, 2006

(30) Foreign Application Priority Data

Jan. 17, 2002   (IL) .................................... 147691

(51) Int. Cl.
*E05C 19/10* (2006.01)
*E05C 5/00* (2006.01)

(52) U.S. Cl. ..................... 292/97; 292/26; 292/29; 292/63; 292/109; 292/113; 292/196

(58) Field of Classification Search ............... 292/97, 292/5, 6, 26, 29, 48, 63, 66, 71, 100, 109, 292/111, 113, 196, 200, 304, DIG. 31, DIG. 46, 292/DIG. 51, DIG. 69, DIG. 71, 96, 98, 292/122–124, 127, 132, 135, 197, 221, 222–224, 292/227, 232, 234, 237; 29/97
See application file for complete search history.

(56) References Cited

U.S. PATENT DOCUMENTS

| 920,478 | A | * | 5/1909 | Keating | 292/114 |
|---|---|---|---|---|---|
| 1,083,173 | A | * | 12/1913 | Zeckhauser | 292/5 |
| 1,573,866 | A | * | 2/1926 | Rogers | 292/113 |
| 2,867,465 | A | * | 1/1959 | Noord | 292/216 |
| 3,390,908 | A | * | 7/1968 | Schlage | 292/195 |
| 3,586,360 | A | * | 6/1971 | Perrotta | 292/26 |
| 3,695,068 | A | * | 10/1972 | Eads et al. | 70/107 |
| 3,831,580 | A | * | 8/1974 | McLean | 126/197 |
| 4,056,276 | A | * | 11/1977 | Jarvis | 292/201 |
| 4,127,016 | A | * | 11/1978 | Ibsen | 70/92 |
| 4,129,325 | A | * | 12/1978 | Hern et al. | 292/127 |

(Continued)

FOREIGN PATENT DOCUMENTS

DE          634552       *  7/1994

(Continued)

*Primary Examiner*—Brian E. Glessner
*Assistant Examiner*—Carlos Lugo
(74) *Attorney, Agent, or Firm*—Dekel Patent Ltd; David Klein (57) ABSTRACT

A rotary motion mechanism including a rotatable element geometrically lockable at two points (e.g., limits) of travel, and a linear motion element linked to the rotatable element, the linear motion element being adapted to move in response to a linear motion imparted thereto and to cause rotation of the rotatable element.

6 Claims, 10 Drawing Sheets

U.S. PATENT DOCUMENTS

| | | | | |
|---|---|---|---|---|
| 4,593,945 | A | * | 6/1986 | Arute et al. .................. 292/201 |
| 4,607,510 | A | * | 8/1986 | Shanaan et al. ................ 70/95 |
| 4,913,475 | A | * | 4/1990 | Bushnell et al. ............. 292/144 |
| 4,961,602 | A | * | 10/1990 | Pettersson ..................... 292/98 |
| 5,098,139 | A | * | 3/1992 | Larsson ........................ 292/97 |
| 5,269,586 | A | * | 12/1993 | Hahn et al. .................. 296/224 |
| 5,688,001 | A | * | 11/1997 | Klein et al. .................... 292/67 |
| 6,663,147 | B1 | * | 12/2003 | Alban ......................... 292/27 |
| 6,953,232 | B2 | * | 10/2005 | Busby et al. ............. 312/332.1 |

FOREIGN PATENT DOCUMENTS

| | | | |
|---|---|---|---|
| DE | 677634 | * | 3/1995 |

* cited by examiner

ROTARY MOTION MECHANISM

FIELD OF THE INVENTION

The present invention relates generally to mechanisms for transferring linear motion to rotary motion.

BACKGROUND OF THE INVENTION

Many devices are known for transferring linear motion to rotary motion. For example, the linkage in an internal combustion engine between the pistons and the crankshaft transfers the linear reciprocating motion of the pistons to the rotary motion of the crankshaft. Some mechanisms that transfer linear to rotary motion, such as in the example of the linkage in the engine, are dedicated to continuous motion. Other mechanisms, instead of providing continuous motion, constrain the motion between limits of travel. Some push-pull or toggle mechanisms are examples of such mechanisms. However, the known mechanisms lack the ability to geometrically lock at the limits of travel.

SUMMARY OF THE INVENTION

The present invention seeks to provide an improved mechanism for transferring linear motion to rotary motion, wherein the rotary motion is constrained between two points of travel, and wherein there is geometrical locking at the points of travel.

There is thus provided in accordance with a preferred embodiment of the present invention a rotary motion mechanism including a rotatable element geometrically lockable at two points (e.g., limits) of travel, and a linear motion element linked to the rotatable element, the linear motion element being adapted to move in response to a linear motion imparted thereto and to cause rotation of the rotatable element.

In accordance with a preferred embodiment of the present invention the two points of travel are defined by structure formed in the rotatable element.

Further in accordance with a preferred embodiment of the present invention the structure comprises a plurality of grooves adapted for receiving therein a portion of the linear motion element, wherein one of the grooves defines a first point of travel of the rotatable element when the portion of the linear motion element is received therein, and another of the grooves defines a second point of travel of the rotatable element when the portion of the linear motion element is received therein.

Still further in accordance with a preferred embodiment of the present invention the rotatable element is rotatable about a pivot and at least two of the grooves are offset from the pivot.

In accordance with a preferred embodiment of the present invention the linear motion element is adapted to cause the rotatable element to rotate when the portion of the linear motion element is not positioned in the grooves that define the points of travel.

Further in accordance with a preferred embodiment of the present invention the plurality of grooves comprises a groove that is not one of the grooves that define the points of travel.

Still further in accordance with a preferred embodiment of the present invention the linear motion element is adapted to cause the rotatable element to rotate when the portion of the linear motion element is positioned in the groove that is not one of the grooves that define the points of travel.

Additionally the grooves comprise at least three grooves formed generally in a clover shape in the rotatable element.

In accordance with a preferred embodiment of the present invention the rotatable element comprises a hook.

Further in accordance with a preferred embodiment of the present invention the linear motion element comprises a link arm coupled with the rotatable element.

Still further in accordance with a preferred embodiment of the present invention the link arm comprises a first pin at one end thereof that engages a slot formed in the linear motion element, and a second pin at a second end thereof receivable in any of the grooves formed in the rotatable element.

Additionally in accordance with a preferred embodiment of the present invention the first pin is constrained to travel in a first channel, and the second pin is constrained to travel in a second channel.

There is also provided in accordance with a preferred embodiment of the present invention a mechanical system including a rotatable element geometrically lockable at two points of travel, a linear motion element linked to the rotatable element, the linear motion element being adapted to move in response to a linear motion imparted thereto and to cause rotation of the rotatable element, and a linkage apparatus adapted to move the linear motion element in the linear motion. The system may include an element actuable by rotation of the rotatable element.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Reference is now made to FIGS. 1A–1E and 2A–2E, which illustrate rotary motion mechanism 10, constructed and operative in accordance with a preferred embodiment of the present invention.

The rotary motion mechanism 10 may include a rotatable element 12. Although the invention is not limited to the example illustrated in the figures, the rotatable element 12 may comprise a pivot 14 about which the rotatable element 12 may rotate, and two or more recesses or grooves offset from the pivot 14. In the illustrated embodiment, three grooves 16, 17 and 18 are formed generally in a clover shape in the rotatable element 12. The rotatable element 12 may comprise a hook 20.

The rotary motion mechanism 10 may include a linear motion element 22. Although the invention is not limited to the example illustrated in the figures, the linear motion element 22 may comprise a tongue 24 that protrudes from a body 26 that pivots about a pivot 28. A groove or slot 30 may be formed in body 26.

Figure 1A:
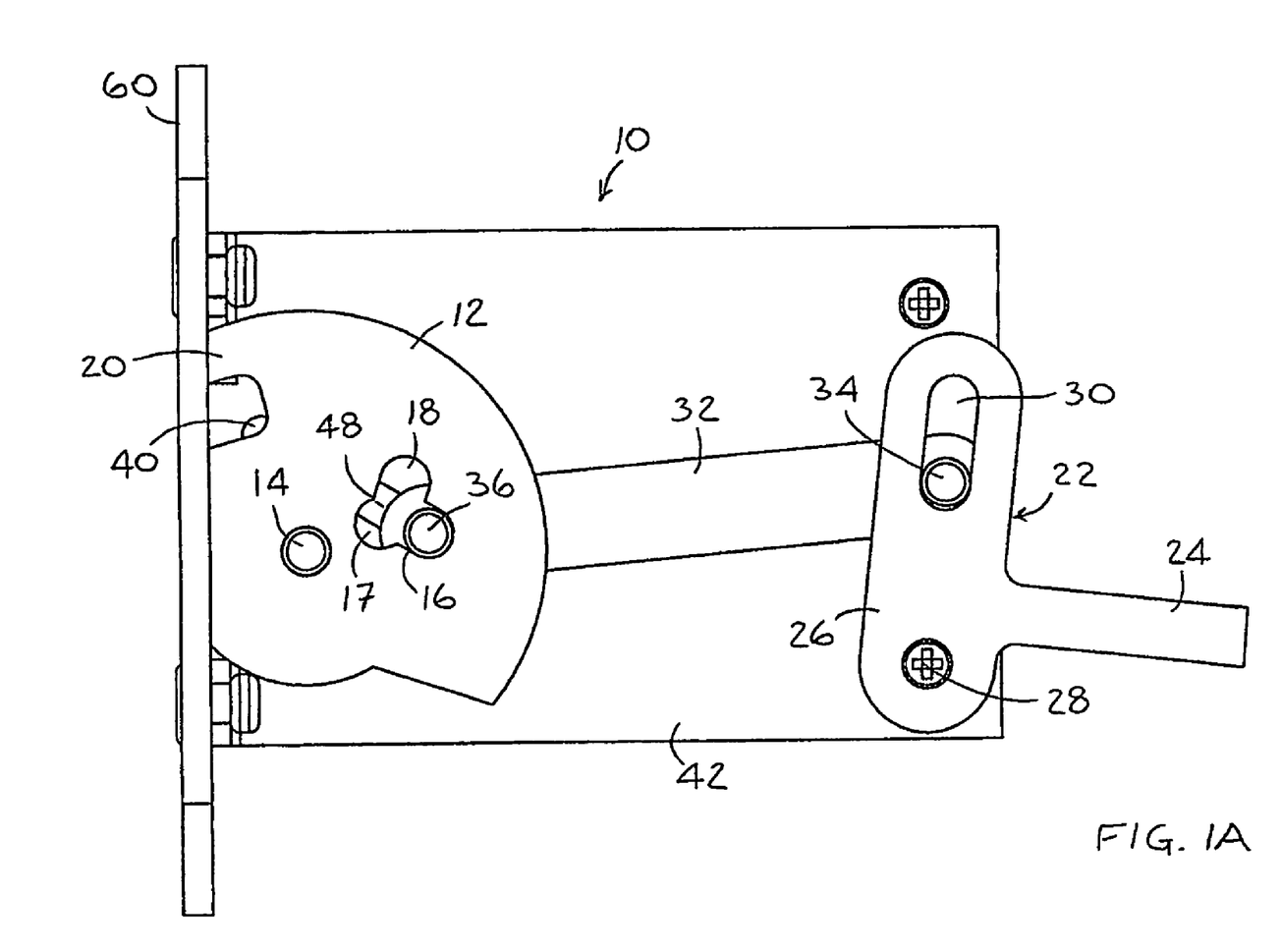
FIGS. 1A–1E are simplified front view illustrations of a rotary motion mechanism, constructed and operative in accordance with a preferred embodiment of the present invention, wherein the mechanism is progressively rotated from a first point of travel to a second point of travel, and the mechanism is geometrically locked in place at both points of travel.
Figure 1B:
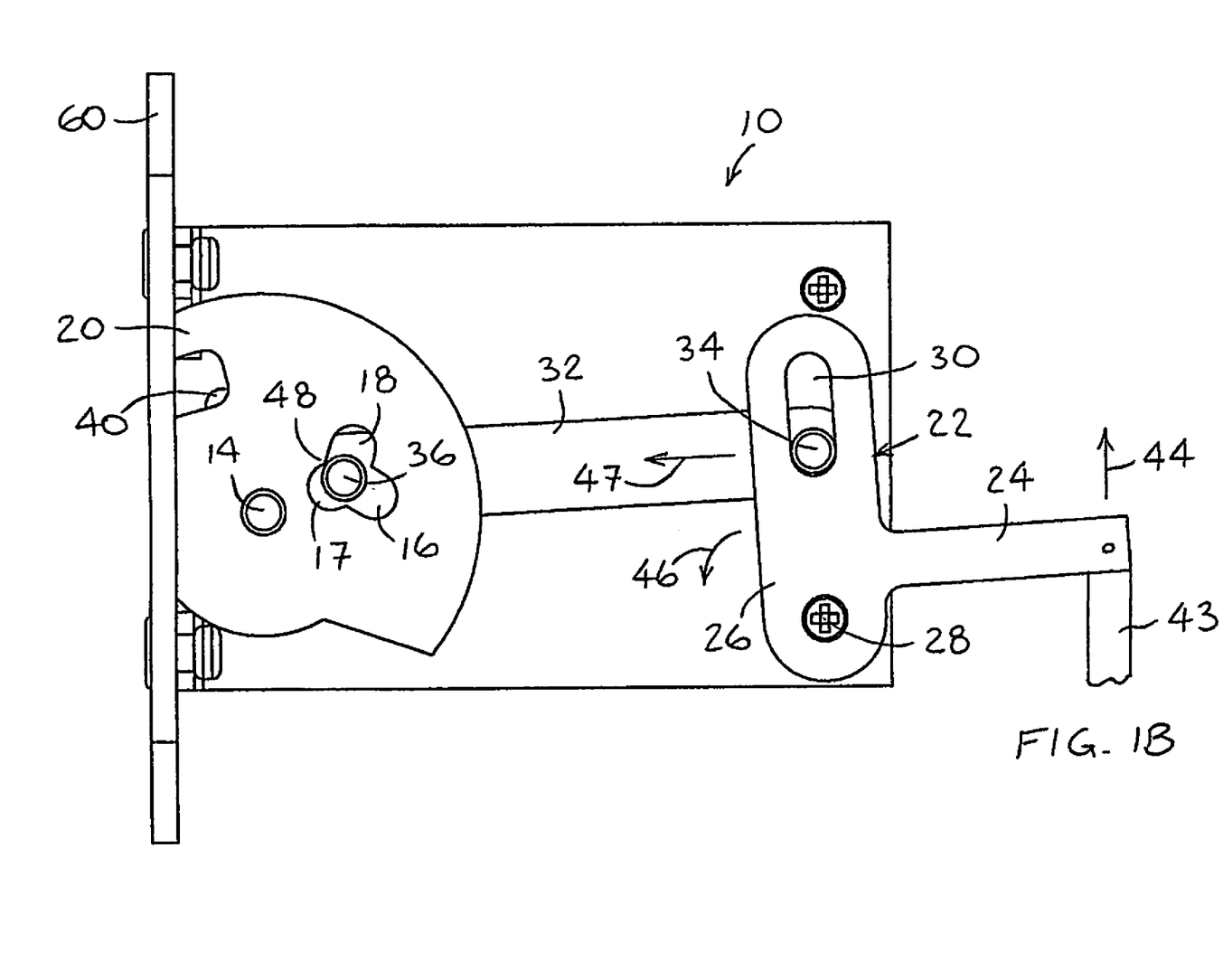
Figure 1C:
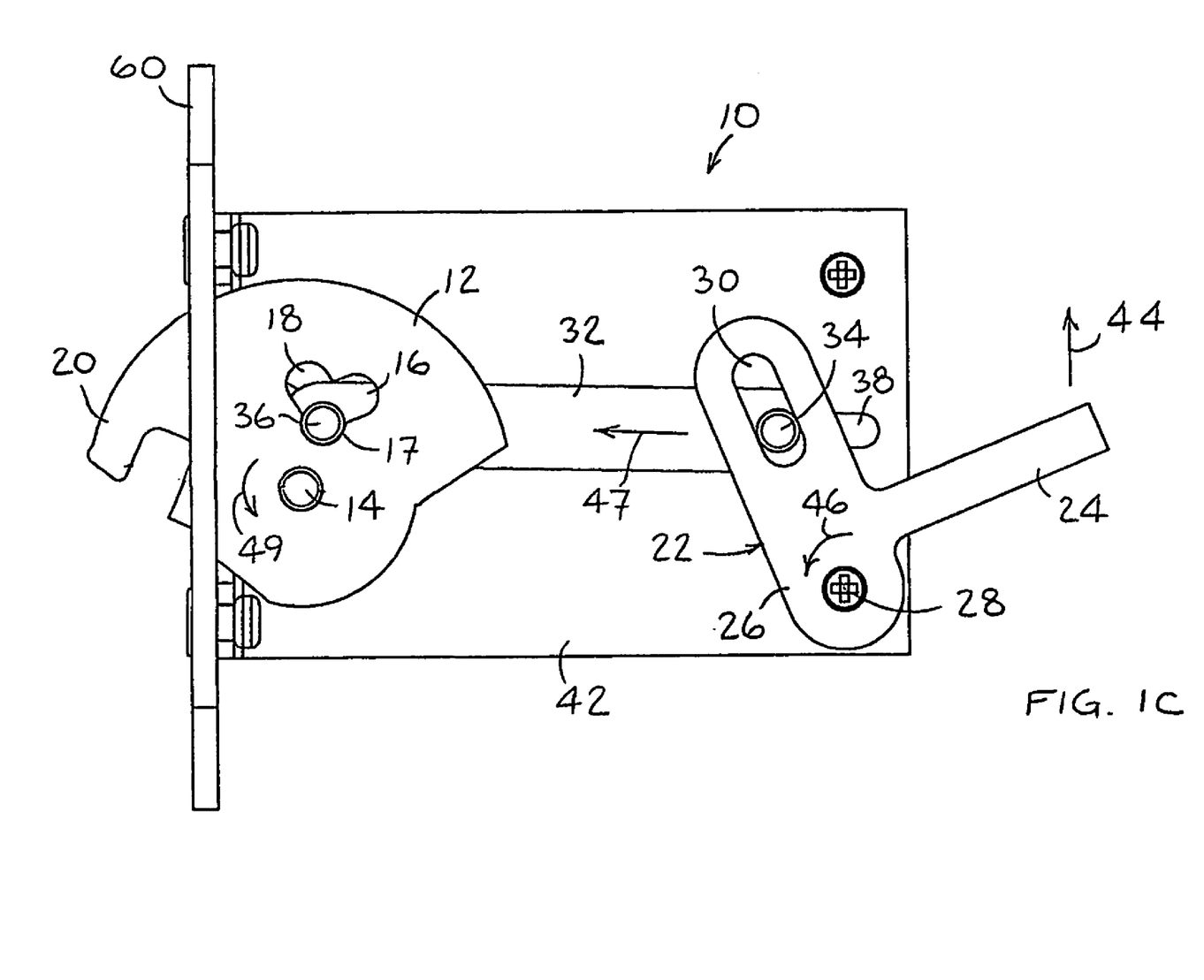

The linear motion element 22 may comprise a link arm 32, which is preferably coupled with the rotatable element 12. Although the invention is not limited to the example illustrated in the figures, the link arm 32 may comprise a bar with a first pin 34 at one end thereof that engages slot 30 of the linear motion element 22, and another second pin 36 at another end thereof that engages any of the grooves 16, 17 or 18. First pin 34 may be constrained to travel in a slot or first channel 38 (FIGS. 1D and 1E), and second pin 36 may be constrained to travel in a slot or second channel 40 (FIGS. 1A, 1B and 1C). Channels 38 and 40 may be formed in a base or substrate 42, which may also serve as the base for the pivots 14 and 28.

Figure 2A:
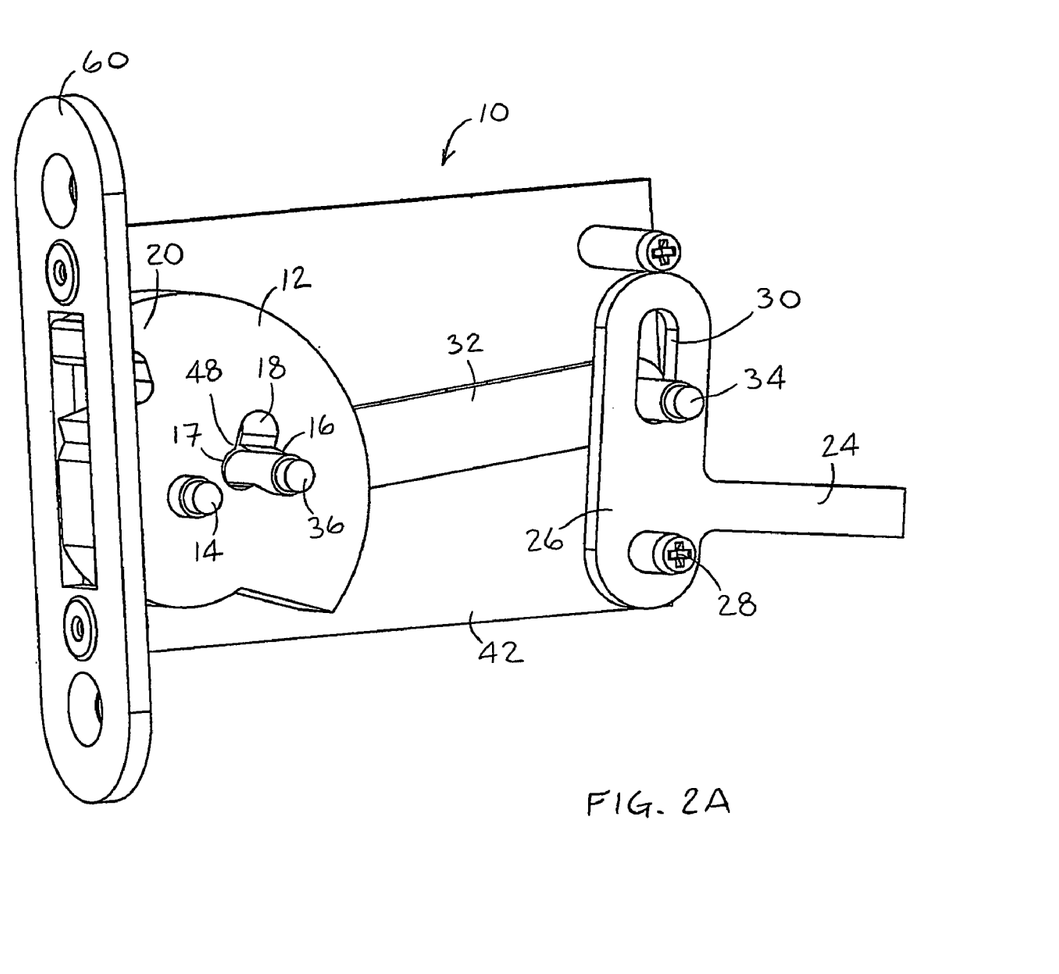
FIGS. 2A–2E are simplified pictorial illustrations of the rotary motion mechanism, corresponding respectively to FIGS. 1A–1E.

In FIGS. 1A and 2A, second pin 36 (i.e., a portion of link arm 32) is fully received in groove 16, thereby geometrically locking rotatable element 12, that is, preventing rotation of rotatable element 12. Thus, the rotary motion mechanism 10 is at a first point (for example, limit) of travel and geometrically locked in place.

Figure 2B:
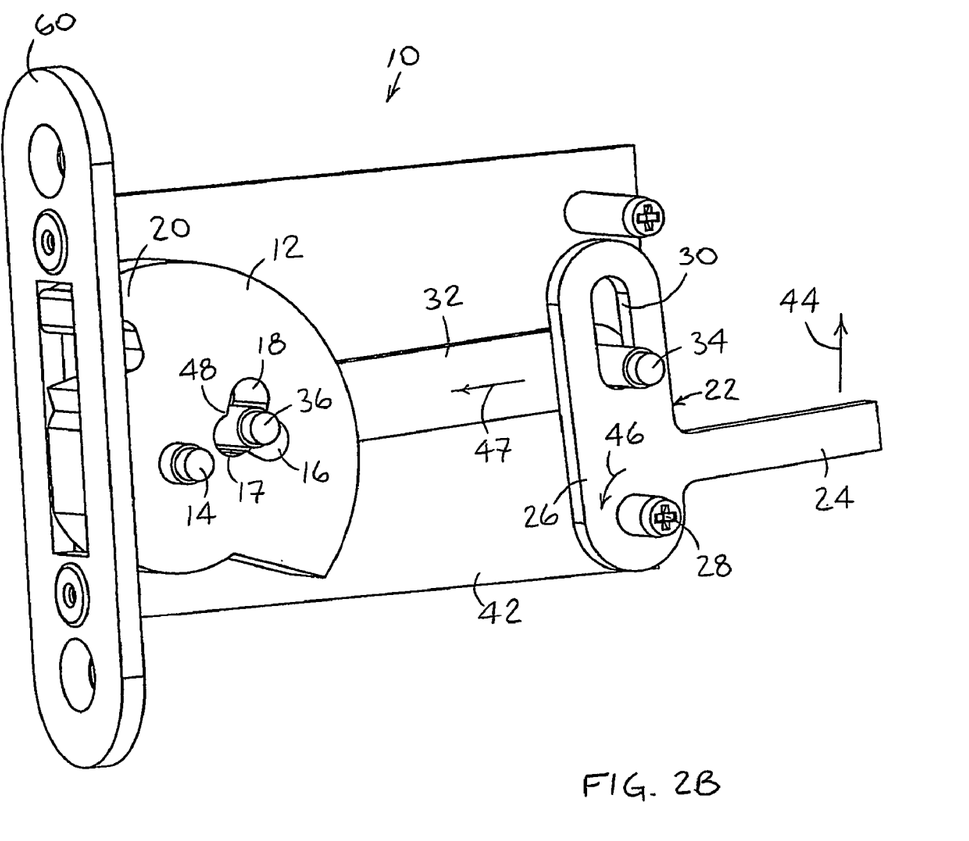

Reference is now made to FIGS. 1B and 2B, which illustrate initial actuation of the rotary motion mechanism 10. Tongue 24 may be lifted by a linkage apparatus 43 (shown only in FIG. 1B and omitted in the rest of the drawings for the sake of clarity) generally in the direction of an arrow 44, thereby causing the linear motion element 22 to pivot about pivot 28 generally in the direction of an arrow 46. Linkage apparatus 43 may comprise a rod, bar or other similar device, for example. Alternatively, tongue 24 may be lifted by a hand, finger or foot, for example. As the linear motion element 22 pivots, groove 30 pushes first pin 34 and the link arm 32 generally in the direction of an arrow 47 (along first channel 38). This causes second pin 36 to move out of groove 16, along second channel 40, towards a junction 48 of grooves 17 and 18. FIGS. 1B and 2B show second pin 36 abutting against junction 48. Until this point, rotatable element 12 has not yet started to rotate about pivot 14.

Figure 2C:
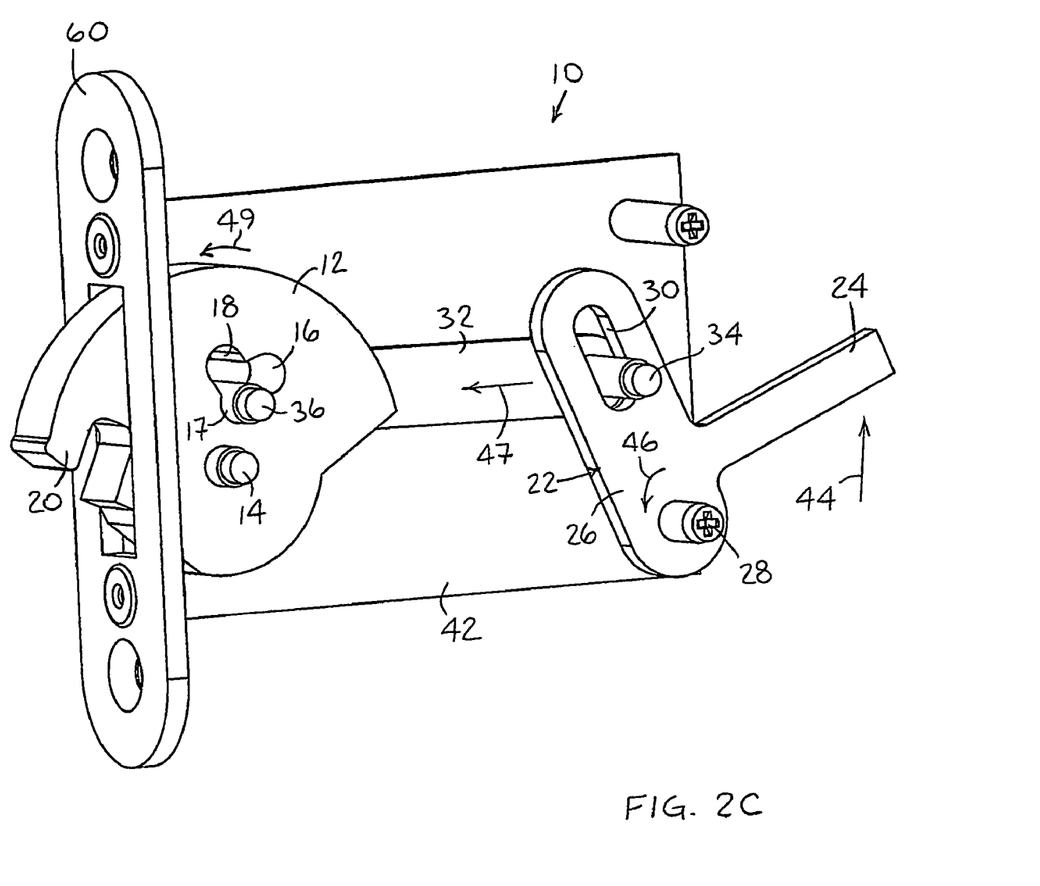

As tongue 24 continues to move in the direction of arrow 44, and linear motion element 22 continues to pivot about pivot 28, link arm 32 continues to move generally in the direction of arrow 47. As shown in FIGS. 1C and 2C, this urges second pin 36 into groove 17 and causes rotatable element 12 to rotate generally in the direction of an arrow 49 about pivot 14.

Figure 1D:
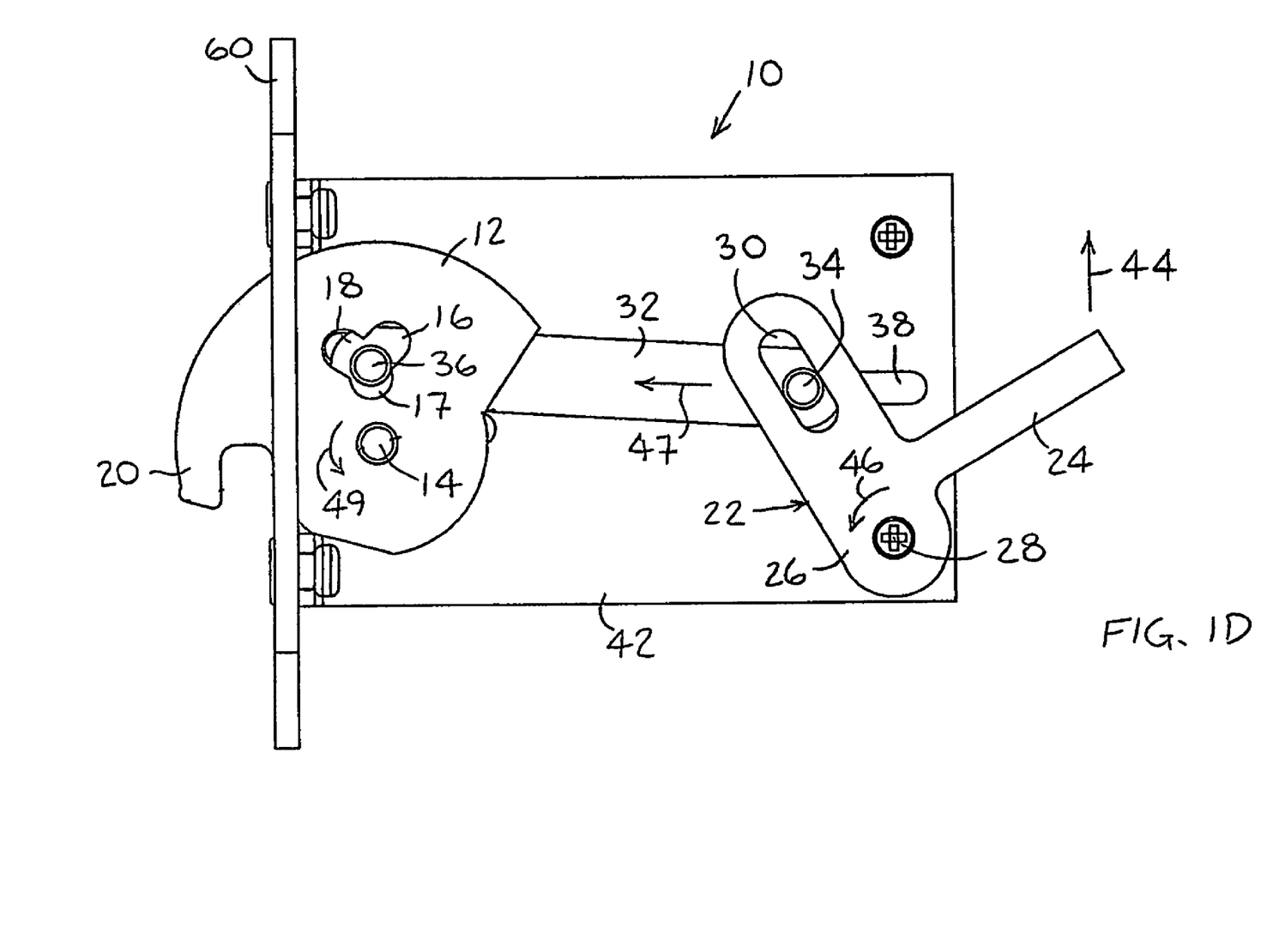
Figure 2D:
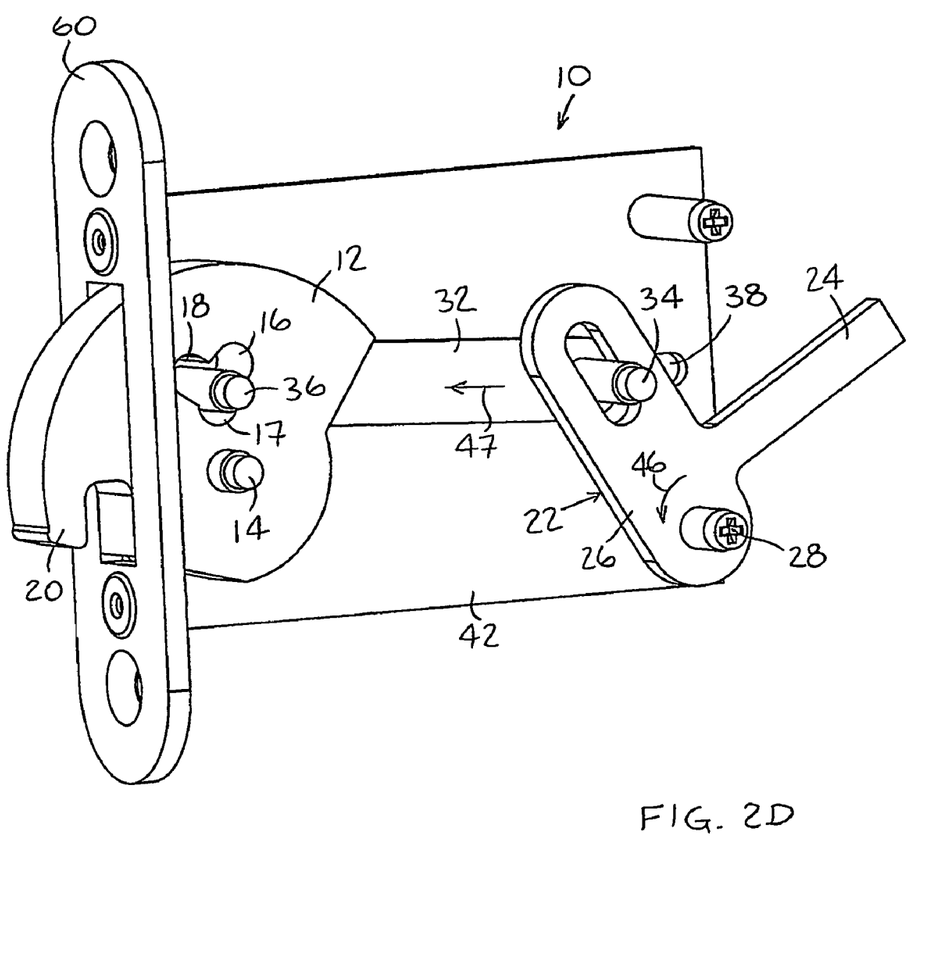

In FIGS. 1D and 2D, tongue 24 continues to move in the direction of arrow 44, and linear motion element 22 continues to pivot about pivot 28 in the direction of arrow 46, second pin 36 continues to move along second channel 40 and rotatable element 12 continues to pivot about pivot 14 in the direction of arrow 49. This motion moves second pin 36 out of groove 17 towards groove 18.

Figure 1E:
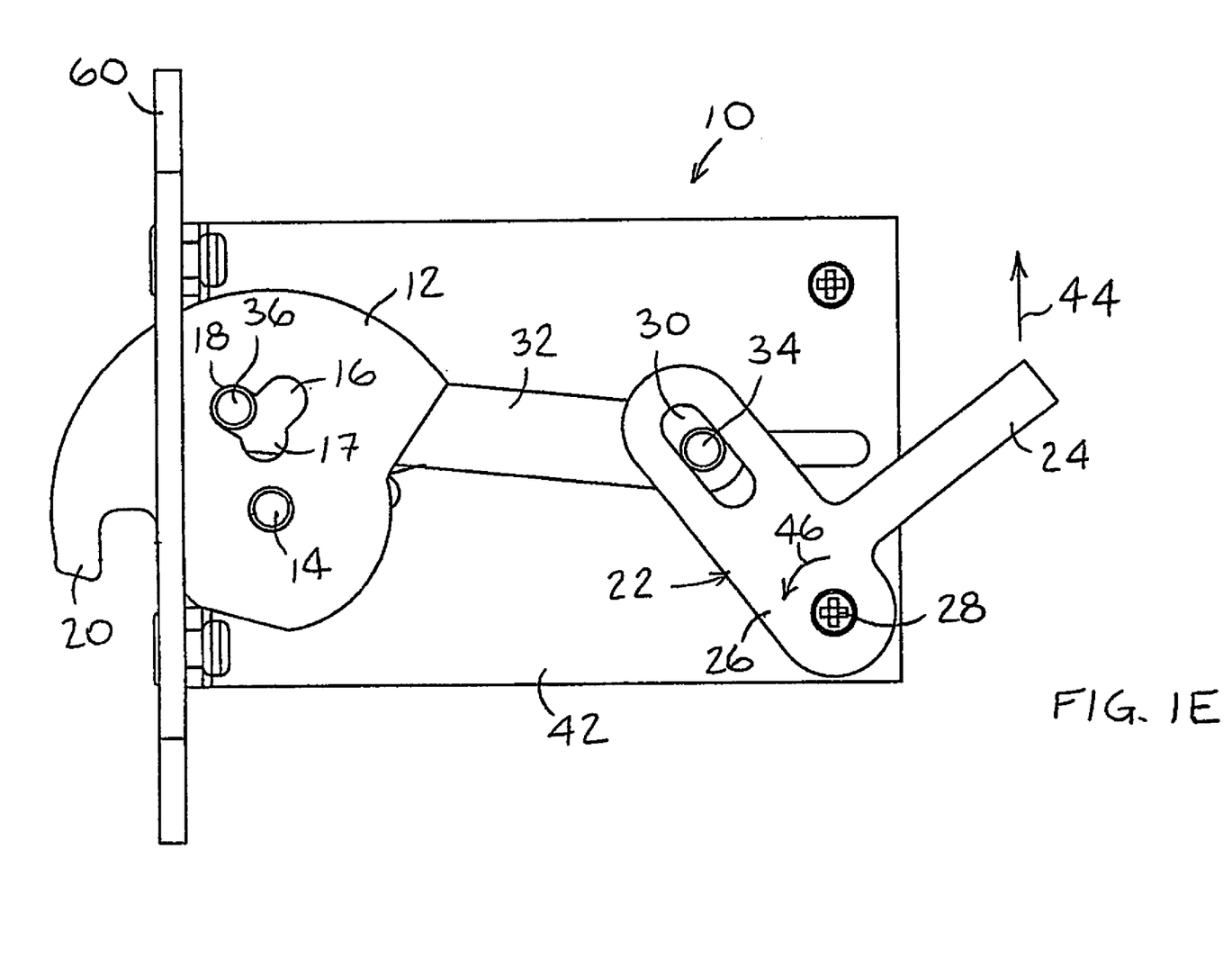
Figure 2E:
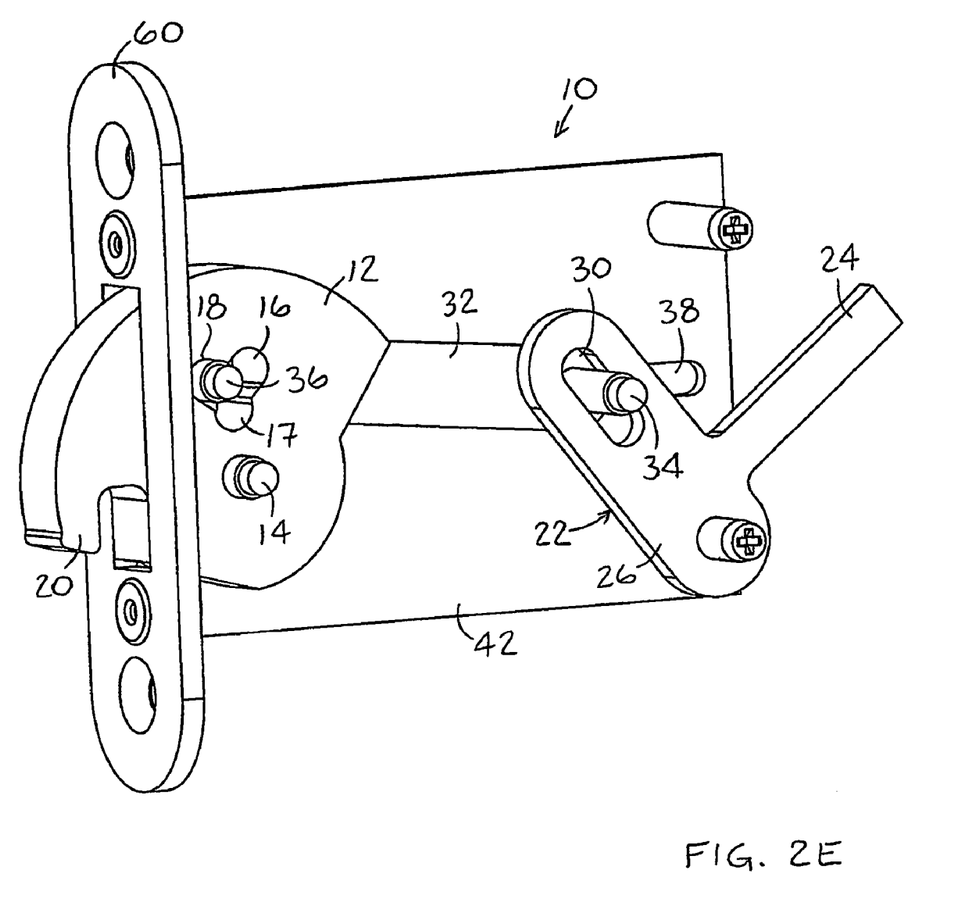

Finally, in FIGS. 1E and 2E, tongue 24 continues to move in the direction of arrow 44, and linear motion element 22 continues to pivot about pivot 28 in the direction of arrow 46, until second pin 36 slides into groove 18. Once this happens, second pin 36 is locked in groove 18, thereby geometrically locking rotatable element 12, that is, preventing further rotation of rotatable element 12. Thus, the rotary motion mechanism 10 is at a second point (for example, limit) of travel and geometrically locked in place.

The rotary motion mechanism 10 may be brought back to the orientation of FIG. 1, by moving tongue 24 generally in the direction opposite to arrow 44 and reversing the above-described process.

The rotary motion mechanism 10 may be implemented in a mechanical system that comprises rotary and linear motion. The mechanical system may comprise a wide range of devices, and may include an element actuable by rotation of rotatable element 12, such as the hook 20, for example. For example, the rotary motion mechanism 10 may be part of a door lock system installed in a door, and hook 20 may be adapted to protrude from an escutcheon 60 into a door frame (not shown). Geometrically locking hook 20 at the second point of travel may substantially increase the locked security of the door. Other examples of devices may include a plowing mechanism, wherein it is desired to lock the plowing mechanism at two different points of travel, such as one orientation for plowing the ground and another orientation lifted above the ground. It is appreciated that these are just two examples of many other implementations of the rotary motion mechanism 10 of the invention.

It will be appreciated by person skilled in the art that the present invention is not limited by what has been particularly shown and described herein above. Rather the scope of the present invention is defined only by the claims that follow:

What is claimed is:

1. A rotary motion mechanism comprising:
    a rotatable element geometrically lockable at two points of travel; and
    a linear motion element linked to said rotatable element, said linear motion element being adapted to move in response to a linear motion imparted thereto and to cause rotation of said rotatable element, wherein said two points of travel are defined by structure formed in said rotatable element, said structure comprising a plurality of grooves adapted for receiving therein a portion of said linear motion element, wherein one of said grooves defines a first point of travel of said rotatable element when said portion of said linear motion element is received therein, and another of said grooves defines a second point of travel of said rotatable element when said portion of said linear motion element is received therein, and wherein said plurality of grooves comprises an additional groove that is not one of said grooves that define the points of travel.

2. The mechanism according to claim 1 wherein said rotatable element is rotatable about a pivot and at least two of said grooves are offset from said pivot.

3. The mechanism according to claim 1 wherein said linear motion element is adapted to cause said rotatable element to rotate when said portion of said linear motion element is not positioned in said grooves that define the points of travel.

4. The mechanism according to claim 1 wherein said linear motion element is adapted to cause said rotatable element to rotate when said portion of said linear motion element is positioned in the groove that is not one of said grooves that define the points of travel.

5. The mechanism according to claim 1 wherein said grooves comprise at least three grooves formed generally in a clover shape in said rotatable element.

6. The mechanism according to claim 1 wherein said rotatable element comprises a hook.

* * * * *